United States Patent [19]

Zanvettor

[11] 4,427,806

[45] Jan. 24, 1984

[54] POWDER COMPOSITION FOR PREPARING SELF-EXTINGUISHING COATINGS

[75] Inventor: Sergio Zanvettor, Belluno, Italy

[73] Assignee: Ducati Elettrotecnica S.p.A., Bologna, Italy

[21] Appl. No.: 347,505

[22] Filed: Feb. 10, 1982

[30] Foreign Application Priority Data

Feb. 19, 1981 [IT] Italy ................. 45707 A/81

[51] Int. Cl.³ ............................................. C08K 3/22
[52] U.S. Cl. ..................... 523/460; 523/457; 524/904
[58] Field of Search ............. 523/440, 460, 457; 524/904

[56] References Cited

U.S. PATENT DOCUMENTS

| 3,039,987 | 6/1962 | Elbling | 524/904 |
| 3,206,330 | 9/1965 | Chottiner | 523/457 |
| 3,336,251 | 8/1967 | Manasia | 523/904 |
| 3,645,926 | 2/1972 | Dunlop . | |
| 4,009,223 | 2/1977 | Noonan | 524/904 |
| 4,042,550 | 8/1977 | Tuller et al. | 523/457 |
| 4,122,060 | 10/1978 | Dimitri | 524/904 |
| 4,218,360 | 8/1980 | Burhans et al. | 523/457 |

FOREIGN PATENT DOCUMENTS

| 660449 | 4/1963 | Canada | 524/904 |
| 53-33298 | 3/1978 | Japan | 523/457 |

*Primary Examiner*—Lewis T. Jacobs
*Attorney, Agent, or Firm*—Wenderoth, Lind & Ponack

[57] ABSTRACT

An improved powder composition for preparing self-extinguishing coatings containing epoxy resin, fluidizing agent, hardening agent, catalyst, pigment and filler, characterized in that the composition does not contain any halogen component, and the filler is an inorganic filler containing at least one self-extinguishing agent, such as $Al(OH)_3$, which is capable of producing a non-toxic substance exhibiting a self-extinguishing function.

6 Claims, No Drawings

POWDER COMPOSITION FOR PREPARING SELF-EXTINGUISHING COATINGS

BACKGROUND OF THE INVENTION

The present invention relates to a thermosetting powder composition which can be used to prepare self-extinguishing coatings on objects, for example, electrical components, to protect them from the environment.

More particularly, the present invention is concerned with epoxy resin-based powder compositions which can be used to form protective coatings on electrical components, which coatings exhibit a self-extinguishing action in case of fire resulting from an external heat source or from overheating as a result of failure or breakdown of the electrical component.

In the present specification and claims, the term "self-extinguishing" means that the coating, if it catches fire, is capable of extinguishing itself, without any assistance.

Conventionally, self-extinguishing coating compositions contain epoxy resins having an epoxy equivalent of 450-1000, a fluidizing agent, a hardening agent (e.g. an acid anhydride), a catalyst (e.g. a tertiary amine) in an amount of 0.4-1.5% by weight based on the weight of the composition, a pigment, and a filler. These coating compositions are usually applied by a "fluidized bed" immersion technique, whereby the composition, in powder form, is brought into the state of a suspension by means of gases or air flowing upward through an appropriately vibrating porous baffle which supports the powder, thus producing a fluidized bed of the powder. The filler employed in these conventional coating compositions has the function of providing an appropriate particle size distribution for the composition which enables the fluidized bed to be formed during use of the composition in the fluidized bed immersion technique.

The conventional self-extinguishing coating compositions which are based on an epoxy resin are those in which the epoxy resin contains a halogen, such as bromine or chlorine, in a rather substantial amount. In fact, the self-extinguishing capability of such conventional epoxy resin-based coating compositions is achieved by using an epoxy resin containing a substantial amount of halogen. This creates a rather serious disadvantage in that, when the composition is heated, the halogen is liberated, giving off toxic fumes. Some such fumes are produced while the coating composition is being applied to the object to be coated. Additionally, of course, substantial fumes are given off when the coated object catches fire. In both cases, the net result is to create a danger to human health.

Concerning the manner in which the coating composition based on an epoxy resin has conventionally been applied to the object to be coated, this can be accomplished by heating the object to be coated to a temperature higher than the softening point of the coating composition, and immersing the object several times in a suspension of the powder (by the fluidized bed immersion technique discussed above) for a certain period of time sufficient for the powder to soften, adhere to and melt on the heated surfaces of the object to be coated, thus forming a homogenous and continuous protective coating on the object. The thus coated object is then heated a second time to cause gelling and subsequent polymerization in the composition to obtain a uniform, hard protective coating.

In addition to causing a health problem as mentioned above, some of the substances, such as chlorine, in the conventional epoxy resin-based self-extinguishing coating compositions exhibit a marked deleterious effect on the degree of pigmentation of the coating if the coated objects are exposed to ultraviolet rays.

SUMMARY OF THE INVENTION

One object of the present invention is to overcome the disadvantages discussed above in connection with the use of the conventional epoxy resin-based self-extinguishing powder coating compositions.

A more specific object of the present invention is to provide a powder composition for preparing self-extinguishing coatings which avoids the necessity for using epoxy resin-based compositions containing a halogen.

Another object of the invention is to provide a novel coating composition which is capable of producing a continuous protective coating of substantially uniform thickness on the object to be coated, which protective coating has operational characteristics which are at least as good as those exhibited by protective coatings formed by using the conventional coating compositions.

Another object of the present invention is to provide a coating composition which possesses, depending on its melting point and maximum processing temperature, a sufficiently high viscosity so that it can adhere to vertical surfaces, edges and corners of the objects to be coated.

Another object is to provide a coating composition which is capable of uniformly spreading over all of the parts of the object to be coated, during the relatively low viscosity stages occuring during the polymerization, without dripping off the surfaces of the object.

In accordance with the present invention, these objects are accomplished by providing, in a powder composition for preparing self-extinguishing coatings, comprising an epoxy resin, a fluidizing agent, a hardening agent, a catalyst, a pigment and a filler, the improvement wherein the composition does not contain any halogen or halogen-containing substance, and the filler is an inorganic filler containing at least one self-extinguishing agent capable of producing a non-toxic substance capable of exhibiting a self-extinguishing function.

DETAILED DESCRIPTION OF THE INVENTION

The present invention thus relates to an improvement in the conventional epoxy resin-based self-extinguishing powder coating compositions as discussed above. The improvement resides in, first of all, providing a powder composition which does not contain any halogen or halogen-containing substance, thus avoiding the potential health hazards discussed above when using the conventional compositions containing halogens such as bromine and chlorine. Secondly, the improvement involves using a filler which is an inorganic filler containing at least one self-extinguishing agent capable of producing a non-toxic substance, which non-toxic substance is capable of exhibiting a self-extinguishing function.

Other than for these improved features of the composition, the powder composition of the present invention can contain the same components as the conventional compositions. Thus, the epoxy resins used in the present invention can be the same as those employed in the conventional compositions, except of course for the fact that they must not contain any halogen component. The fluidizing agents, hardening agents, catalysts, and pigments employed in the powder composition of the present invention can be the same as those which have been employed in the conventional compositions. Additionally, the same fillers as employed in the conventional compositions can also be employed in the composition of the present invention, as long as they are inorganic. However, in contrast to the conventional compositions, the composition of the present invention contains, in place of or in addition to the conventional inorganic fillers, at least one self-extinguishing agent capable of producing a non-toxic substance capable of exhibiting a self-extinguishing function.

The term "capable of producing a non-toxic substance capable of exhibiting a self-extinguishing function" as employed in the present specification and claims means that the self-extinguishing agent, when heated, produces a substance which is not harmful to humans, and that this substance is capable of extinguishing a flame, or glow caused by ignition, on the coated object.

The preferred self-extinguishing agent for use in the present invention is Al(OH)$_3$. However, any self-extinguishing agent can be employed, as long as it is capable of accomplishing the stated object, i.e. produces a non-toxic substance capable of exhibiting a self-extinguishing function.

In a preferred embodiment of the present invention, $Sb_2O_3$ is incorporated in the filler.

The preferred amount of Al(OH)$_3$ employed in the present invention is about 33%, and the preferred amount of $Sb_2O_3$ is about 5%, by weight based on the weight of the powder composition. However, the amount of Al(OH)$_3$ may be 30 to 40%, and the amount of $Sb_2O_3$ may be 2 to 5%.

The use of $Sb_2O_3$ for flame retardancy in liquid resin compositions is already known, but its use in a powder composition of solid resins presents problems in producing a composition which can be uniformly spread over the object to be coated when the powder is first applied to the heated surfaces of the object. For this reason, in the present invention, the amount of $Sb_2O_3$ is maintained at a relatively low amount, i.e. preferably about 5% by weight, to improve the spreadability of the composition at the working temperature and during the time period involved in applying the composition to the objects to be coated.

It is also preferable that at least about 50%, more preferably from about 50 to about 69%, of the powder particles in the composition have an average particle size in the range of about 40 to 150$\mu$. Al(OH)$_3$ is quite suitable for this purpose. Additionally, it ensures the basic self-extinguishing function as required in the present invention because, when it is heated at a high temperature (at least 600° C.), it breaks down or decomposes to liberate water which extinguishes any flame or glow in the coating as a result of ignition.

The stability of the fluidized bed in applying a powder coating composition is known to be dependent on the form and particle size of the powder employed. The particle size distribution, especially in the medium to large size range, of the particles, and their geometric form, are important from the standpoint of maintaining the powder in suspended dynamic equilibrium as a result of the upward movement of the gas and the weight of the particles. Crevices or air flow lines should not be created in the suspension, since this would break the continuity of the cloud formed by the powder suspension. Therefore, the powder composition should preferably have an average particle size which satisfies these features. The particle size distributions noted above, wherein at least about 50%, more preferably from about 50 to about 69%, of the powder particles have an average particle size of about 60$\mu$, serve this purpose.

The thicknesses of the coatings which can be obtained in using the composition of the present invention are the same as those which can be obtained in using the conventional compositions, for example, coatings having a thickness of 0.3–3 mm can be obtained. Coatings of such thicknesses are generally employed in forming protective coatings for electronic components.

Without intending to limit the invention, an example of an especially preferred powder composition in accordance with the present invention is set forth in the Table below.

TABLE

| | |
|---|---|
| Epoxy resin with epoxy equivalent 750–850, melting point 80–95° C. | 51.00% |
| Fluidizing agent | 3.00% |
| Acid anhydride (hardening agent) | 7.00% |
| Tertiary amine (catalyst) | 0.70% |
| Al(OH)$_3$ (filler) | 33.00% |
| $Sb_2O_3$ (filler) | 5.00% |
| Pigment | 0.30% |
| Total | 100.00 |

An example of the epoxy resin is DER 663 U (Registered Trade Mark by Dow Chemical), or EPIKOTE 1003 (Registered Trade Mark by Shell), and an example of the pigment is $Fe_2O_3$, or $TiO_2$.

An example of the acid anhydride is Nadic Methyl Anhydride (methyl-bicyclo [2.2.1] heptene-2,3-dicarboxylic anhydride), or hexahydrophthalic anhydride, and an example of the tertiary amine is dimethylaminomethylphenol. However, any acid anhydride or tertiary amine employed in the conventional powder compositions based on epoxy resins can be employed in the present invention.

The fluidizing agent is generally mixed with a small portion of the epoxy resin prior to incorporating the fluidizing agent in the powder composition. Any fluidizing agent which has been used in preparing the conventional compositions can be employed in the present invention. An example of the fluidizing agent is MODAFLOW (Registered Trade Mark by Monsanto).

The composition is prepared in a conventional process, by dry mixing the resin and other components, in a turboshaker.

The coating composition in accordance with the present invention has many and diverse physical properties, and requires careful preparation in order to enable the composition to become liquefied, and form a coating, on the preheated object to be coated, during application of the coating composition. In this regard the powder coating composition should preferably have a melting point of from about 90° to about 105° C. By operating under the guidelines set forth above, such requirements can be satisfied.

Through experimentation, it has been found that the optimum characteristics for the coating composition are obtained when employing a formulation in accordance with the Table set forth above, although, as pointed out above, this formulation is not intended to limit the invention thereto.

Thus, in accordance with the present invention, a powder composition for preparing self-extinguishing coatings can be prepared, as an improved composition over the conventional composition, by excluding the halogen of the conventional composition, and also using, as the filler, an inorganic filler containing at least one self-extinguishing agent capable of producing a non-toxic substance capable of exhibiting a self-extinguishing function. Except for these differences, the powder composition of the present invention is the same, and can be prepared and used in the same manner, as the conventional powder compositions which are based on an epoxy resin. The improved composition according to the present invention is one which exhibits its self-extinguishing function according to IEC Standard 65, forming a substance which is non-toxic to the individuals who prepare the coated object using the composition, as well as to the users of the coated object who are exposed to the object during its operation.

Whereas the present invention has been described in relation to particular features thereof, it is apparent that other and further modifications apart from those described herein may be made within the spirit and scope of the invention. For example, the percentages of the components of the composition may be varied, or Mg(OH)$_2$ may be used in place of Al(OH)$_3$. Also, the composition can be used to coat objects other than electronic components.

In any case, the powder composition for preparing self-extinguishing coatings according to the present invention uses, as the filler, an inorganic filler containing at least one self-extinguishing agent which, when it is heated at a high temperature, is capable of liberating water, that is producing a non-toxic substance capable of extinguishing any flame or glow in the coating as a result of ignition.

I claim:

1. In a powder composition for preparing self-extinguishing coatings, comprising a solid epoxy resin, a fluidizing agent, a hardening agent, a catalyst, a pigment and a filler, the improvement wherein the composition does not contain any halogen or halogen-containing substance, and the filler is an inorganic filler containing Al(OH)$_3$ capable of producing a non-toxic substance capable of exhibiting a self-extinguishing function.

2. A composition according to claim 1, wherein the amount of the Al(OH)$_3$ is 30 to 40% by weight based on the weight of the composition.

3. A composition according to claim 1, wherein the hardening agent is an acid anhydride.

4. A composition according to claim 1, wherein the catalyst is a tertiary amine.

5. A powder composition for preparing self-extinguishing coatings, comprising an epoxy resin having an epoxy equivalent of 750–850 and a melting point of 80°–95° C., a fluidizing agent, an acid anhydride, a tertiary amine, Al(OH)$_3$, Sb$_2$O$_3$ and a pigment, with the provision that the composition does not contain any halogen or halogen-containing substance.

6. A composition according to claim 5, consisting of about 51% of the epoxy resin, about 3% of the fluidizing agent, about 7% of the acid anhydride, about 0.70% of the tertiary amine, about 33% of the Al(OH)$_3$, about 5% of the Sb$_2$O$_3$, and about 0.30% of the pigment, all percentages being by weight, based on the weight of the composition.

* * * * *